United States Patent [19]

Russey

[11] 3,997,183
[45] Dec. 14, 1976

[54] STEP-GRAB ELEMENT SYSTEM FOR A VEHICLE
[75] Inventor: James W. Russey, Decatur, Ill.
[73] Assignee: Caterpillar Tractor Co., Peoria, Ill.
[22] Filed: Sept. 22, 1975
[21] Appl. No.: 615,650
[52] U.S. Cl. .............................. 280/166; 105/444; 182/97; 182/106
[51] Int. Cl.² ......................................... B60R 3/02
[58] Field of Search .............. 280/166; 182/91, 97, 182/98, 106; 105/443, 444, 447

[56] References Cited
UNITED STATES PATENTS

| | | | |
|---|---|---|---|
| 1,122,063 | 12/1914 | Blake | 105/444 |
| 3,190,392 | 6/1965 | Ashton et al. | 182/97 |
| 3,232,376 | 2/1966 | Lucas et al. | 182/97 |
| 3,508,627 | 4/1970 | Lypko et al. | 182/97 |
| 3,869,022 | 3/1975 | Wallk | 280/166 X |

Primary Examiner—Robert R. Song
Assistant Examiner—Michael J. Forman
Attorney, Agent, or Firm—Frank L. Hart

[57] ABSTRACT

A step-grab element system is provided for ascending to or descending from an elevated position on a vehicle. A step and a grab element are each pivotally connected to the vehicle and are connected to one another for moving the step between an operable position and an inoperable, protected position in response to moving the grab element between an operable position and an inoperable, protected position.

6 Claims, 3 Drawing Figures

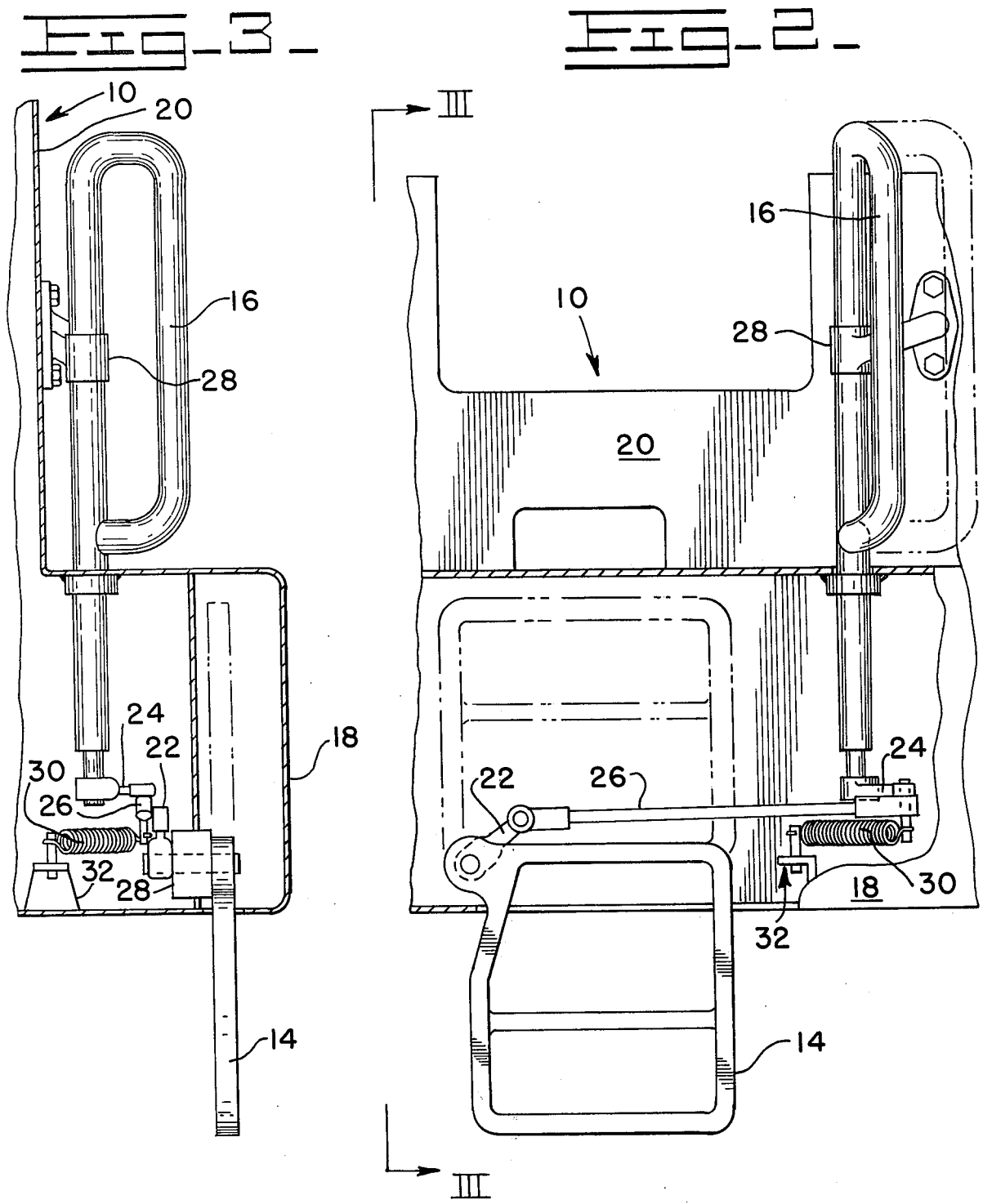

STEP-GRAB ELEMENT SYSTEM FOR A VEHICLE

BACKGROUND OF THE DISCLOSURE

Work vehicles, such as wheel tractor-scrapers, crawler tractors, and the like, are often operated in rough, rocky terrain. These vehicles are often sufficiently large to require a step or ladder in order for an operator to conveniently move between the ground and the platform upon which he rides during operation of the vehicle. During operation of these type vehicles, the step or ladder is often impacted by objects which can cause damage to the step and sometimes separate the step from the vehicle.

This invention is therefore directed to a step-grab element system that is effective in protecting the step and grab element during use of the vehicle and which is of simple construction and convenient to move between a protected position and an operable position.

BRIEF DESCRIPTION OF THE DRAWINGS

FIG. 2 is a diagramatic frontal view of the step-grab element system; and

FIG. 3 is a diagramatic side view of the step-grab element system of FIG. 2.

DETAILED DESCRIPTION OF THE INVENTION

Figure 1:
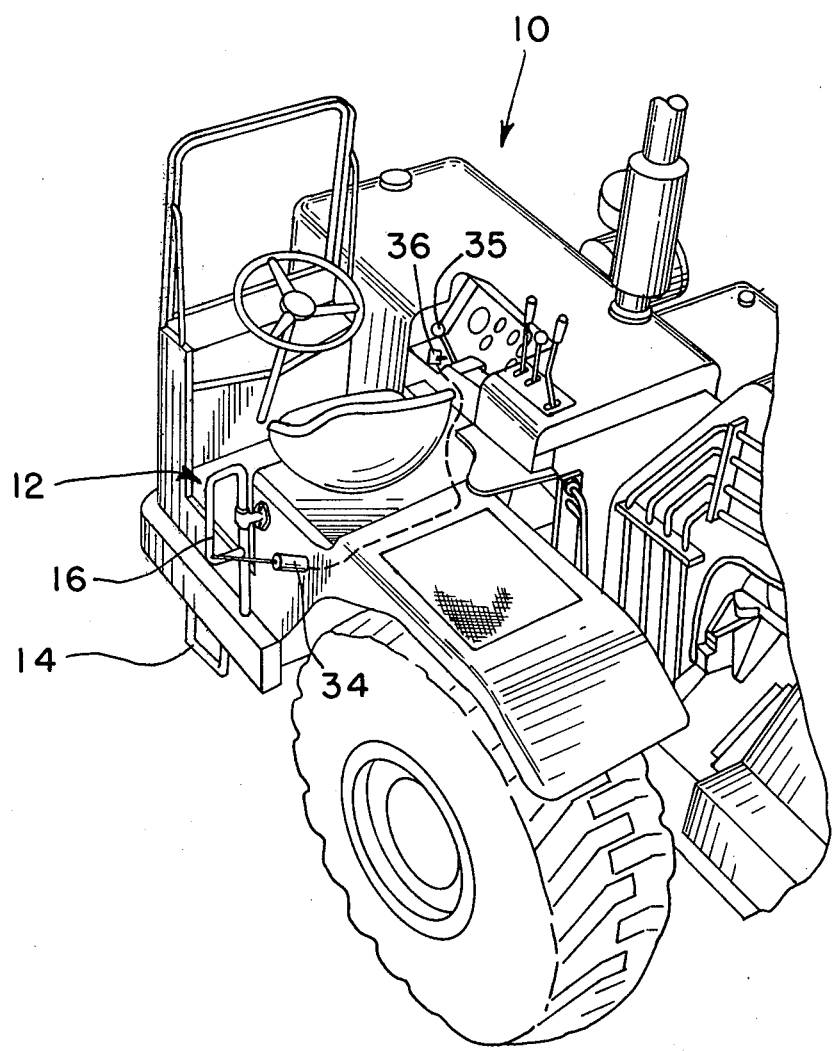
FIG. 1 is a diagramatic view of a portion of a vehicle having the step-grab element system of this invention.

A vehicle 10 has an elevated location 12 to and from which an operator must move. In the example shown, the elevated location is the platform upon which the operator is positioned during operation of the vehicle and the vehicle is a wheel-tractor scraper. It should be understood, however, that the step-grab element system of this invention can be used on other vehicles and for ascending to or descending from other elevated locations.

The step-grab element system has a grab element 16 and a step assembly comprising a single step or a ladder having a plurality of steps. For brevity, the step system will hereafter be referred to as a single step 14. The step 14 and grab element 16 are pivotally connected to the vehicle.

Referring to FIGS. 2 and 3, the step 14 is pivotally connected to the vehicle 10 for movement between a first position, shown by broken lines, at which the step is extending along a wall 18 of the vehicle 10 and is elevated, protected, and in an inoperative attitude and a second position, shown by solid lines, at which the step 14 is downwardly depending from the vehicle 10 and usably disposed relative to the vehicle 10. In the example shown in the drawings, the wall 18 is a fender of the vehicle 10.

The grab element 16 is pivotally connected to the vehicle 10 at a location laterally spaced from and at a higher elevation than the step 14. As known in the art, a grab element 16 is constructed for receiving the fingers of an operator and is an element which he can grasp and steady himself as he moves on the step or ladder.

The grab element 16 is pivotally connected to a wall 20 or other structure of the vehicle 10 and movable between a first position, shown by broken lines at which the grab element 16 is extending along the vehicle 10 and protected against damage, and a second position, shown by solid lines, at which the grab element is extending outwardly from the vehicle 10 and at an attitude at which the grab element 16 can be easily grasped.

In the first position of the step 14 and grab element 16, their close proximity to the vehicle protects them from damage by impact during operation of the vehicle 10. At their second position, both the step 14 and grab element 16 extend outwardly from the vehicle and are in a usable position.

Means are provided for connecting the step 14 to the grab element 16 for movement of the step between its first and second positions in response to movement of the grab element 16 between its corresponding first and second positions. Therefore, with the step 14 and grab element 16 in the second position, movement of the grab element 16 by the operator to its first position causes the step to move to a protected position.

The means utilized for connecting the step 14 and grab element 16 for synchronous movement is a first bell crank 22 connected to the step 14, a second bell crank 24 connected to the grab element 16 and a tie bar 26 connected on opposed ends to each of said bell cranks 22,24.

The step 14 and grab element 16 can be pivotally connected to the vehicle 10 by any means known in the art such as, for example, rings 28.

The system can have biasing means 30, such as a helical spring, associated therewith for urging the step 14 and grab element 16 to the first position in response to movement of the grab element 16 a preselected distance from the second toward the first position.

In the preferred embodiment, the spring 30 has one end connected to the outer end of one of the bell cranks 22 or 24, preferably the second bell crank 24, and the other end anchored to the vehicle 10 by brace 32. The spring is positioned overcenter for operation as set forth above.

A solenoid 34, diagramatically shown in FIG. 1, can be associated with the grab element 16 for moving the grab element the preselected distance for causing the step to be moved by the spring 30 to the first position. The solenoid 34 can be connected to actuation means of the vehicle, for example gear shift 35, by a magnetic reed switch 36, for example, for actuation of the reed switch and the solenoid in response to actuating the vehicle 10.

It should be understood, however, that this automatic feature for moving the step 14 to the first position in response to actuating the vehicle 10 or placing the vehicle in gear can be by other means associated with other portions of the vehicle without departing from the invention.

By so providing the apparatus of this invention, the step and grab element are protected from damage during operation of the vehicle. Where the step-grab system is automated and associated with the controls of the vehicle, retraction of the step in response to operation of the vehicle is not dependent upon the operator's memory to move the grab element 16 from the second to the first position after mounting the platform.

Other aspects, objects and advantages will become apparent from a study of the drawings, the disclosure, and the appended claims.

What is claimed is:

1. Apparatus for ascending to or descending from an elevated location on a vehicle, comprising:
    at least one step pivotally connected to the vehicle for rotation about a horizontal axis and being movable along a substantially vertical pathway between a first, protected position at which the step is extending along the vehicle and a second, usable position at which the step is extending outwardly from the vehicle;

a grab element pivotally connected to the vehicle at a location spaced from the step and being movable about a vertical axis and along a substantially horizontal pathway between a first, protected position at which the grab element is extending along the vehicle and a second usable position at which the grab element is extending outwardly from the vehicle; and means extending between the spaced step and grab element and connecting the step to the grab element for substantially vertical movement of the step between the first and second positions in response to substantially vertical rotational movement of the grab element between its first and second positions.

2. Apparatus, as set forth in claim 1, wherein the means comprises:

a bell crank connected to the step;

a bell crank connected to the grab element; and a tie bar connected at each opposed end to a respective bell crank.

3. Apparatus, as set forth in claim 2, including biasing means for urging the step to the first position in response to the grab element substantially horizontally being moved a preselected distance from the second toward the first position.

4. Apparatus, as set forth in claim 3, including means associated with the grab element and being operably connected to the vehicle for moving the grab element said preselected distance in response to actuating the vehicle.

5. Apparatus, as set forth in claim 3, wherein the means for moving the grab element is a solenoid.

6. Apparatus, as set forth in claim 4, wherein the grab element moving means is connected to actuation means of the vehicle through a switch.

* * * * *